United States Patent [19]

Tzikas et al.

[11] Patent Number: 4,968,782
[45] Date of Patent: Nov. 6, 1990

[54] FIBRE-REACTIVE DYES CONTAINING A SUBSTITUTED SULFONYLAMINOCARBONYL GROUP

[75] Inventors: Athanassios Tzikas, Pratteln; Peter Aeschlimann, Allschwil, both of Switzerland

[73] Assignee: Ciba-Geigy Corporation, Ardsley, N.Y.

[21] Appl. No.: 423,710

[22] Filed: Oct. 13, 1989

Related U.S. Application Data

[63] Continuation of Ser. No. 147,957, Jan. 25, 1988, abandoned.

[30] Foreign Application Priority Data

Feb. 6, 1987 [CH] Switzerland .......................... 444/87

[51] Int. Cl.$^5$ .................. C09B 62/503; C07C 147/05; C07D 295/18; C07F 9/09
[52] U.S. Cl. ..................................... 534/618; 534/617; 534/641; 534/643; 540/130; 540/132; 540/133; 540/134; 544/99; 552/230; 552/231
[58] Field of Search ............... 534/617, 643, 641, 618; 544/99; 540/130, 132, 133, 134

[56] References Cited

U.S. PATENT DOCUMENTS 4,766,206 8/1988 Tzikas .................. 534/643

FOREIGN PATENT DOCUMENTS 0174909 3/1986 European Pat. Off. ............ 534/643
0210951 2/1987 European Pat. Off. ............ 534/643

*Primary Examiner*—Floyd D. Higel
*Attorney, Agent, or Firm*—Wenderoth, Lind & Ponack

[57] ABSTRACT

Reactive dyes of the formula

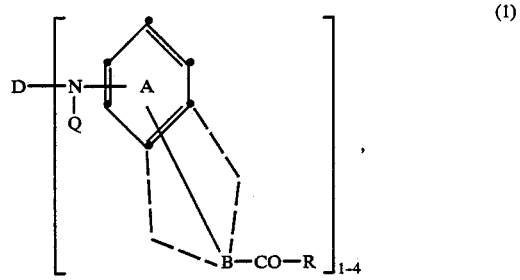

in which D is the radial of an anthraquinone, phthalocyanine, formazan, azomethine, dioxazine, phenazine, triphenylmethane, xanthene, thioxanthone, nitroaryl, naphthoquinone, pyrenequinone or perylenetetracarbimide dye; Q is hydrogen or alkyl which has 1 to 4 carbon atoms and can be substituted by carboxyl, sulfo, cyano, hydroxyl, $C_1$-$C_4$ alkoxy or halogen; B is a radical —$CH_{2n}$, —O—$CH_{2n}$ or —NH—$CH_{2n}$ and n is 1 to 6; R is a radical of the formula

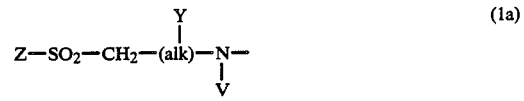

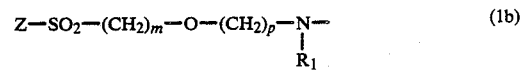

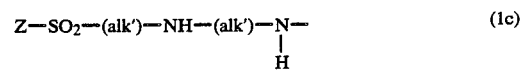

or

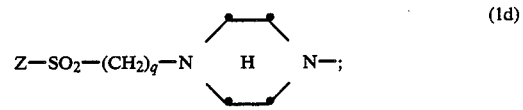

Z is $\beta$-sulfatoethyl, $\beta$-thiosulfatoethyl, $\beta$-phosphatoethyl, $\beta$-acyloxyethyl, $\beta$-halogenoethyl or vinyl; alk is an alkylene radical having 1 to 6 C atoms or branched isomers thereof; Y is hydrogen, chlorine, bromine, flourine, hydroxyl, sulfato, acyloxy having 1 to 4 C atoms, cyano, carboxyl, alkoxycarbonyl having 1 to 5 C atoms, carbamoyl or a radical —$SO_2$—Z in which Z is as defined above; V is hydrogen or an alkyl radical which has 1 to 4 C atoms and can be substituted by carboxyl or sulfo groups or by derivatives thereof, alkoxy groups having 1 or 2 C atoms, halogen or hydroxyl; or is a radical

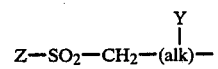

in which Z, alk and Y are as defined above; $R_1$ is hydrogen or $C_1$-$C_6$ alkyl; the alk's independently of one another are polymethylene radicals having 2 to 6 C atoms or branched isomers thereof; m is 1 to 6, p is 1 to 6 and q is 1 to 6; and the benzene or naphthalene radical A can contain further substituents, are particularly suitable for dyeing or printing cellulose-containing fibre materials by the cold pad-batch process, and produce, at a high dye yield, dyeings and prints which have good fastness properties.

4 Claims, No Drawings

FIBRE-REACTIVE DYES CONTAINING A SUBSTITUTED SULFONYLAMINOCARBONYL GROUP

This application is a continuation of now abandoned application Ser. No. 147,957, filed Jan, 25, 1988.

The present application relates to novel, improved reactive dyes which are suitable, in particular, for dyeing cellulose-containing fibre materials by the exhaustion process or the cold pad-batch process, and which produce dyeings fast to wet processing and light; and to processes for the preparation of these dyes and to the use thereof for dyeing or printing textile materials.

The invention relates to reactive dyes of the formula

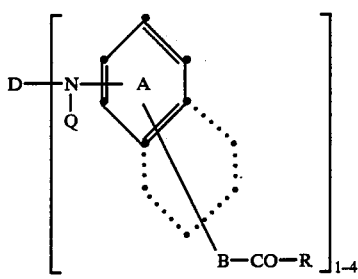

in which D is the radical of an anthraquinone, phthalocyanine, formazan, azomethine, dioxazine, phenazine, triphenylmethane, xanthene, thioxanthone, nitroaryl, naphthoquinone, pyrenequinone or perylenetetracarbiaide dye; Q is hydrogen or alkyl which has 1 to 4 carbon atoms and can be substituted by carboxyl, sulfo, cyano, hydroxyl, $C_1$–$C_4$alkoxy or halogen; B is a radical $-(CH_2)_n-$, $-O-(CH_2)_n-$ or $-NH-(CH_2)_n-$ and n is 1 to 6; R is a radical of the formula

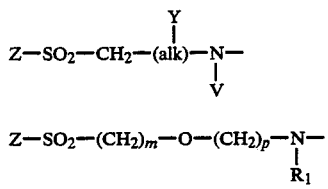 (1a)

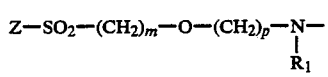 (1b)

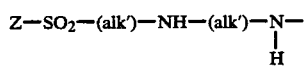 (1c)

or

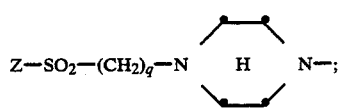 (1d)

Z is β-sulfatoethyl, β-thiosulfatoethyl, β-phosphatoethyl, β-acyloxyethyl, β-halogenoethyl or vinyl; alk is an alkylene radical having 1 to 6 C atoms or branched isomers thereof; Y is hydrogen, chlorine, bromine, fluorine, hydroxyl, sulfato, acyloxy having 1 to 4 C atoms, cyano, carboxyl, alkoxycarbonyl having 1 to 5 C atoms, carbamoyl or a radical $-SO_2-Z$ in which Z is as defined above; V is hydrogen or an alkyl radical which has 1 to 4 C atoms and can be substituted by carboxyl or sulfo groups or by derivatives thereof, alkoxy groups having 1 or 2 C atoms, halogen or hydroxyl; or is a radical

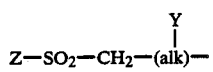

in which Z, alk and Y are as defined above; $R_1$ is hydrogen or $C_1$–$C_6$-alkyl; the alk's independently of one another are polymethylene radicals having 2 to 6 C atoms or branched isomers thereof; m is 1 to 6, p is 1 to 6 and q is 1 to 6; and the benzene or naphthalene radical A can contain further substituents.

The ring system marked A in formula (1) within the square brackets is a benzene or naphthalene nucleus. If B is a radical $-O-(CH_2)_n-$ or $-NH-(CH_2)_n-$, B is attached to the ring system A through the oxygen atom or the $-NH-$ group.

The radical D in formula (1) can contain, attached to its skeleton, the substituents which are customary in organic dyes.

The following may be mentioned as examples of further substituents in the radical D: alkyl groups having 1 to 4 carbon atoms, such as methyl, ethyl, propyl, isopropyl or butyl, alkoxy groups having 1 to 4 carbon atoms, such as methoxy, ethoxy, propoxy, isopropoxy or butoxy, acylamino groups having 1 to 8 carbon atoms, such as acetylamino, propionylamino or benzoylamino, amino, alkylamino having 1 to 4 carbon atoms, such as methylamino, ethylamino, propylamino, isopropylamino or butylamino, phenylamino, N,N-di-β-hydroxyethylamino, N,N-di-β-sulfatoethylamino, sulfobenzylamino, N,N-disulfobenzylamino, alkoxycarbonyl having 1 to 4 carbon atoms in the alkoxy radical, such as methoxycarbonyl or ethoxycarbonyl, alkylsulfonyl having 1 to 4 carbon atoms, such as methylsulfonyl or ethylsulfonyl, trifluoromethyl, nitro, cyano, halogen, such as fluorine, chlorine or bromine, carbamoyl, N-alkylcarbamoyl having 1 to 4 carbon atoms in the alkyl radical, such as N-methylcarbamoyl or N-ethylcarbamoyl, sulfamoyl, N-alkylsulfamoyl having 1 to 4 carbon atoms, such as N-methylsulfamoyl, N-ethylsulfamoyl, N-propylsulfamoyl, N-isopropylsulfamoyl or N-butylsulfamoyl, N-(β-hydroxyethyl)-sulfamoyl, N,N-di-β-hydroxyethyl)-sulfamoyl, N-phenylsulfamoyl, ureido, hydroxyl, carboxyl, sulfomethyl or sulfo. The radical D preferably contains one or more sulfonic acid groups. Further substituents in the radical D are, in particular, methyl, ethyl, methoxy, ethoxy, acetylamino, benzoylamino, amino, chlorine, bromine, ureido, hydroxyl, carboxyl, sulfomethyl or sulfo.

As an alkyl radical, the radical Q is linear or branched; it can contain, as further substituents, carboxyl, sulfo, cyano, hydroxyl, $C_1$–$C_4$-alkoxy or halogen. The following radicals may be mentioned as examples of Q: methyl, ethyl, propyl, isopropyl, butyl, isobutyl, secbutyl, tert-butyl, carboxymethyl, β-carboxyethyl, β-carboxypropyl, sulfomethyl, β-sulfoethyl, β-cyanoethyl, β-hydroxyethyl, β-hydroxybutyl, β-methoxyethyl, β-ethoxyethyl, β-methoxypropyl, β-chloroethyl and γ-bromopropyl. Q is preferably hydrogen. The radical B contains 1 to 6, preferably 1 to 4, carbon atoms; the following are examples of B: methylene, ethylene, propylene, butylene, methyleneoxy, ethyleneoxy, propyleneoxy, butyleneoxy and ethyleneamino.

For Z, the β-chloroethyl radical is particularly suitable as β-halogenoethyl and the β-acetoxyethyl radical is particularly suitable as β-acyloxyethyl. The alkylene radical alk is preferably methylene, ethylene, methylmethylene, propylene or butylene. As an acyloxy radical, the substituent Y is especially acetoxy, propionyloxy or butyryloxy, and as an alkoxycarbonyl radical it is especially methoxycarbonyl, ethoxycarbonyl or propoxycarbonyl. As an alkyl radical, V can be methyl, ethyl, propyl, isopropyl, butyl, isobutyl, sec-butyl or tert-butyl. The following are examples of derivatives of the carboxyl or sulfo group: carbamoyl, N-methylcarbamoyl, N-ethylcarbamoyl, N,N-dimethylcarbamoyl, N,N-diethylcarbamoyl, cyano, acetyl, propionyl, butyryl, methoxycarbonyl, ethoxycarbonyl, propoxycarbonyl, sulfamoyl, N-methylsulfamoyl, N-ethylsulfamoyl, N,N-dimethylsulfamoyl, N,N-diethylsulfamoyl, methylsulfonyl, ethylsulfonyl and propylsulfonyl. Examples of the radical $R_1$ are methyl, ethyl, propyl, isopropyl, butyl, isobutyl, sec-butyl, tert-butyl, pentyl or hexyl, or, preferably, hydrogen. The polymethylene radicals alk' are preferably ethylene, propylene or butylene. The indices m, p and q are independent of one another and are preferably 2, 3 or 4. The index on the square bracket is preferably 1 or 2, particularly if D is a phthalocyanine radical, but is also 3 or 4.

Suitable further substituents on the benzene or naphthalene radical A are the same as those which have been mentioned earlier in the text in the explication of the radical D.

Reactive dyes of the formula (1) in which the radical D also includes a further reactive radical should also be taken into account. The additional reactive radicals included in D can be attached to D via amino groups or in a different manner, for example through a direct bond.

Preferred reactive dyes are those of the formula

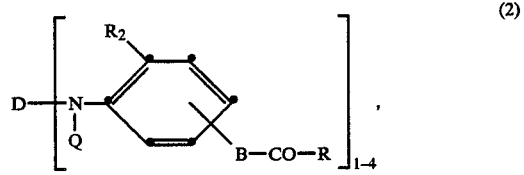

(2)

in which $R_2$ is hydrogen, $C_1$–$C_4$alkyl, $C_1$–$C_4$alkoxy, halogen, hydroxyl, carboxyl or sulfo; and D, Q, B and R are as defined under formula (1).

Reactive dyes of the formula (2) in which D is the radical of an anthraquinone dye are also preferred.

Particularly suitable reactive dyes of the formula (2) are those in which D is the radical of an anthraquinone dye of the formula

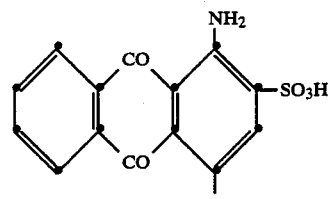

(3)

in which the anthraquinone nucleus can be substituted by a further sulfo group, and the dye preferably contains at least 2 groups which strongly impart solubility in water.

Reactive dyes of the formula (2) in which D is the radical of a phthalocyanine dye are also preferred.

Suitable reactive dyes of this type are, in particular, those of the formula (2) in which D is the radical of a phthalocyanine dye of the formula

(4)

in which Pc is the radical of a copper or nickel phthalocyanine; W is —OH and/or —$NR_3R_4$; $R_3$ and $R_4$ independently of one another are hydrogen or alkyl which has 1 to 4 carbon atoms and can be substituted by hydroxyl, alkoxy, hydroxyalkoxy, sulfo, sulfato or sulfatoalkoxy, or in which —$NR_3R_4$ forms a morpholino radical; and r is 1 to 4.

Compounds of the formulae (1) and (2) which are particularly preferred are those in which Z is the β-sulfatoethyl, β-chloroethyl or vinyl group.

The part of formula (1) or (2) which is enclosed in square brackets can occur one to four times in the molecule. If a dye of the formula (1) contains two, three or four partial formulae of this type, these can be identical or different; they are preferably identical. The square bracket embraces, inter alia, the radical R, which itself in turn contains a reactive radical, specifically the grouping Z—$SO_2$— in the formulae (1a) to (1d). The reactive radical contains a fibrereactive, detatchable group, for example if Z is β-chloroethyl, or become effective in the manner of fibre-reactive, detachable groups, for example if Z is vinyl (for the fundamentals of reactive dyes see Venkataraman, K.: The Chemistry of Synthetic Dyes, New York: Academic Press 1972; Vol. VI, Reactive Dyes).

One process for the preparation of reactive dyes of the formula (1) comprises subjecting a dye of the formula

$D$–$(X)_{1-4}$ (5), in which X is a halogen atom to a condensation reaction with an amine of the formula

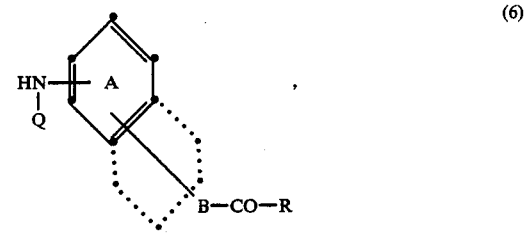

(6)

and, if appropriate, subsequently carrying out a further conversion reaction.

The two compounds of the formulae (5) and (6) are reacted with one another in a suitable molar ratio; this depends on how many detachable halogen atoms X are present in the dye of the formula (5).

A modified embodiment of the process consists in first preparing a dye containing a precursor of the reactive radical and subsequently converting this precursor into the final stage, for example by esterification or by an addition reaction. For example, it is possible to prepare a dye in which Z is a radical HO—$CH_2CH_2$—, and to react the intermediate with sulfuric acid, before or after acylation, so that the hydroxyl group is converted into the sulfato group; or an analogous dye in which Z is the group H$_2$C=CH— is used, and thiosulfuric acid is added onto the intermediate, forming a radical HO$_3$SS—CH$_2$CH$_2$—. The sulfation of the hydroxyl group in a dye of the formula (1) or a suitable precursor is carried out, for example, by reacting it with concentrated sulfuric acid at 0° C. up to a moderately elevated temperature.

The sulfation can also be carried out by reacting the hydroxy compound with two equivalents of chlorosulfonic acid per hydroxyl group at 10 to 80° C. in a polar organic solvent, for example N-methylpyrrolidone. It is preferable to carry out the sulfation by introducing the compound concerned into sulfuric acid monohydrate at temperatures between 5 and 15° C. The introduction of another radical for Z into a compound of the formula (1) or into an intermediate instead of a halogen atom or the sulfato group, for example a thiosulfato or phosphato group, is carried out in a manner known per se.

The synthesis can also be followed by elimination reactions. For example, reactive dyes of the formula (1) containing sulfatoethylsulfonyl radicals can be treated with agents which split off hydrogen halide, such as sodium hydroxide, whereupon the sulfatoethylsulfonyl radicals are converted into vinylsulfonyl radicals.

If appropriate, it is possible to use a process variant in which the starting materials are dye precursors. This variant is suitable for the preparation of reactive dyes of the formula (1) in which D is the radical of a dye composed of two or more than two components, for example a copper or nickel phthalocyanine or a copper formazan. In principle, the reactive dyes of the formula (1) of all classes of dye can be prepared in a manner known per se or analogously to known procedures, by using as starting materials precursors or intermediates for dyes containing fibre-reactive radicals of the formula (1), or by introducing these fibre-reactive radicals into intermediates which have the character of dyes and are suitable for the purpose.

The preferred process for the preparation of the reactive dyes of the formula (1) comprises subjecting a dye of the formula (5) to a condensation reaction with an amine of the formula

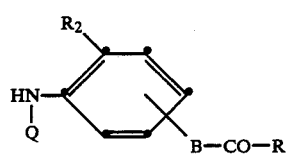

to give a reactive dye of the formula (2). The radicals Q, B, R and R$_2$ are as defined under formula (2).

The condensation reaction of the dye of the formula (5) with the amine of the formula (6) or (7) is carried out in a manner known per se in an acid, neutral or alkaline aqueous solution and at a low or elevated temperature.

If groups capable of forming metal complexes, such as hydroxyl, carboxyl, amino or sulfo, are present in the reactive dyes which have been prepared, the latter can also be metallized subsequently. Apart from the radicals of the formulae (3) and (4) already mentioned, examples of important dye radicals D are

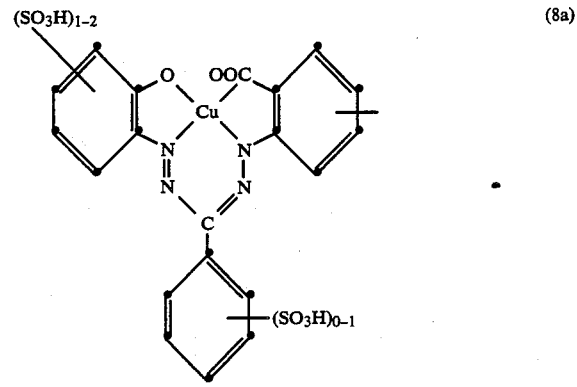

or

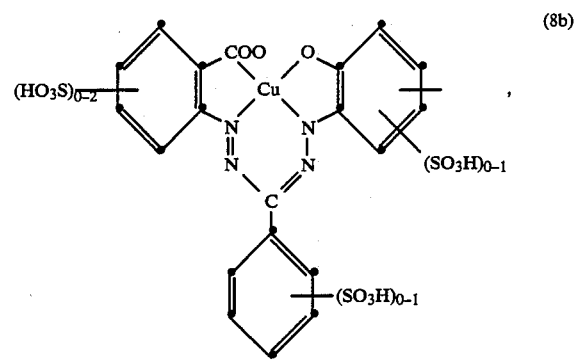

in which the benzene nuclei can be further substituted by alkyl having 1 to 4 C atoms, alkoxy having 1 to 4 C atoms, alkylsulfonyl having 1 to 4 C atoms, halogen or carboxyl; or

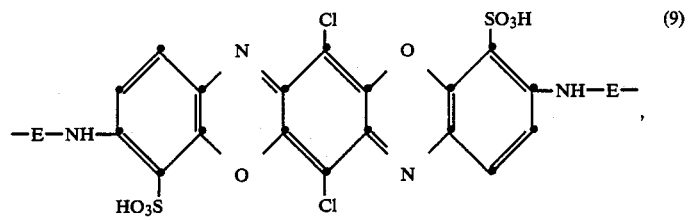

in which E is a phenylene radical which can be substituted by alkyl having 1 to 4 C atoms, halogen, carboxyl or sulfo; or is an alkylene radical having 2 to 6 C atoms; and the outer benzene rings in the formula (9) can be further substituted by alkyl having 1 to 4 C atoms, alkoxy having 1 to 4 C atoms, acetylamino, nitro, halogen, carboxyl or sulfo.

An additional reactive radical which can be included in D is, in particular, a low-molecular alkanoyl or alkylsulfonyl radical which is substituted by a detachable atom or a detachable group, a low-molecular alkenoyl or alkenesulfonyl radical which is unsubstituted or substituted by a detachable atom or a detachable group, a carbocyclic or heterocyclic radical which contains a four-membered, five-membered or six-membered ring and is substituted, via a carbonyl or sulfonyl group, by a detachable atom or a detachable group, or a triazine or pyrimidine radical which is attached directly via a carbon atom and is substituted by a detachable atom or a detachable group, or contains a radical of this type. Examples of reactive radicals of this type which may be mentioned are a six-membered heterocyclic radical which is attached via an amino group and contains halogen atoms, such as a halogenotriazine or halogenopyrimidine radical, or an aliphatic acyl radical, such as a halogenoacetyl or halogenopropionyl radical.

The invention also relates to the compounds of the formulae (6) and (7). They can be prepared by subjecting appropriate nitrophenylalkanoyl, nitrophenoxyalkanoyl or nitrophenyl aminoalkanoyl chlorides or analogous naphthalene compounds to a condensation reaction with amines of the formula $$H-R \tag{10}$$

corresponding to the radicals of the formulae (1a) to (1d), and reducing the nitro group to the amino group.

The reaction is preferably carried out in a high-boiling organic solvent, for example nitrobenzene. The reduction of the nitro group to the amino group is effected in a manner known per se by catalytic hydrogenation with Pd/charcoal in ethanol, ethyl acetate or tetrahydrofuran at room temperature up to about 40° C. The reduction can also be carried out in aqueous solution by means of Fe/hydrochloric acid or Fe/acetic acid.

Using another method, described in German Offenlegungsschrift No. 2,040,620, the acid chloride can be reacted with an unsaturated aliphatic amine and 2-mercaptoethanol can be added onto the double bond of the acid amide at temperatures between 50° C. and 180° C. by means of catalytic amounts of a free-radical-former or sulfur. The hydroxyethyl thioether compounds obtained thereby can also be prepared by subjecting the acid chloride to a condensation reaction with a halogenoalkylamine and heating the condensation product with 2-mercaptoethanol and a sodium alcoholate in alcohol. The thioether compounds are then additionally oxidized to give the corresponding sulfones.

The oxidation of the thioether compounds to the sulfones can be effected by various methods, for example by means of hydrogen peroxide with or without the addition of tungsten or vanadium compounds as catalysts, and also by means of peracetic acid, potassium permanganate or chromic acid, or by means of chlorine/hydrochloric acid, in each case in an aqueous, aqueous organic or organic medium.

The carboxamides obtainable in this way, in which the grouping $-SO_2-Z$ is a $\beta$-hydroxyethylsulfonyl group, can be converted, by treatment with sulfating agents, phosphorylating agents, halogenating agents, alkylsulfonyl or arylsulfonyl halides, alkylcarbonyl or arylcarbonyl halides or alkylcarboxylic or arylcarboxylic anhydrides, into the corresponding dye precursors in which the grouping $-SO_2-Z$ is the grouping $-SO_2-CH_2-CH_2-O-SO_3H$, $-SO_2-CH_2-CH_2-O-PO_3H_2$, $-SO_2-CH_2-CH_2-halogen$, $-SO_2-CH_2-CH_2-O-CO-CH_3$ or $-SO_2-CH_2-CH_2-O-CO-C_6H_5$. The products obtained in this way can, in turn, be converted by treatment with agents having an alkaline reaction, for example an alkali metal hydroxide or alkali metal carbonate, such as sodium hydroxide or sodium carbonate, into corresponding compounds in which the grouping $-SO_2-Z$ is the grouping $-SO_2-CH=CH_2$. The products thus obtained can, in turn, be converted by reaction (addition) with salts of thiosulfuric acid, such as sodium thiosulfate, into compounds in which the grouping $-SO_2-Z$ is the grouping $-SO_2-CH_2-CH_2-S-SO_3H$.

Examples of sulfating agents suitable in this regard are concentrated sulfuric acid and chlorosulfonic acid and sulfamic acid or other compounds which donate sulfur trioxide. Examples of phosphorylating agents suitable in this regard are concentrated phosphoric acid, pyrophosphoric, metaphosphoric or polyphosphoric acid, polyphosphoric acid alkyl esters, phosphorus oxychloride or mixtures of phosphoric acid and phosphorus-(V) oxide. Examples of halogenating agents which can be used are thionyl chloride or thionyl bromide.

Preferred compounds are those of the formula

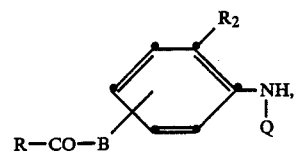

in which R is a radical of the formula

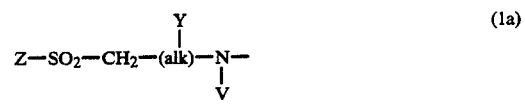

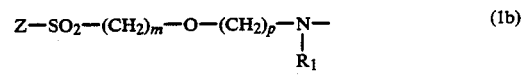

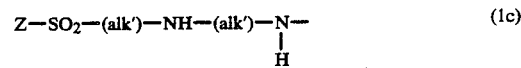

or

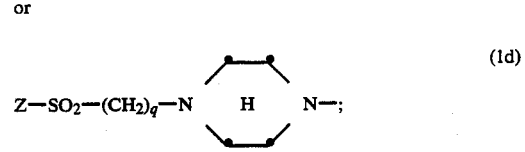

Q, B, Z, alk, Y, V, $R_1$, alk', m, p and q are as defined under formula (1); and $R_2$ is hydrogen, $C_1-C_4$alkyl, $C_1-C_4$alkoxy, halogen, hydroxyl, carboxyl or sulfo. In the compounds of the formula (7), Q is preferably methyl, ethyl, isopropyl or especially hydrogen; $R_2$ is preferably methyl, methoxy, chlorine, hydroxyl, carboxyl, sulfo or especially hydrogen; B is preferably methylene, methyleneoxy, propylene, propyleneoxy or butyleneoxy; and R is preferably one of the above-mentioned radicals of the formulae (1a) to (1d).

The preferred process for the preparation of the compounds of the formula (7) comprises subjecting a compound of the formula

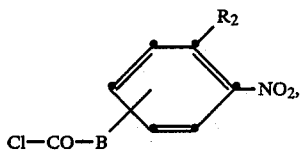

(11)

to a condensation reaction with an amine of the formula

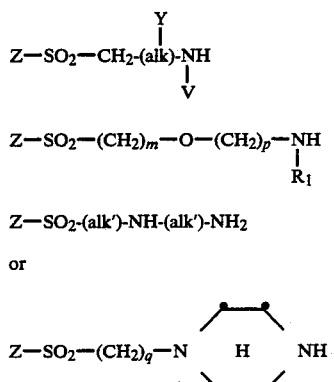

and reducing the nitro group to the amino group.

In a modification of the process described above, it is also possible to prepare compounds of the formula (7) by subjecting a compound of the formula (11) to a condensation reaction with an amine of the formula

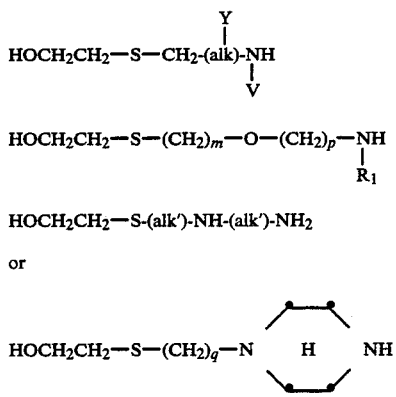

oxidizing the condensation product to give the corresponding β-chloroethylsulfonyl compound with elementary chlorine, and reducing the nitro group to the amino group.

The condensation of the compound of the formula (11) with the amines of the formulae (13a) to (13d) is carried out, for example, in chloroform at room temperature and in the presence of alkaline, acid-binding agents, for example alkali metal hydroxides, carbonates, or bicarbonates. The condensation product is subsequently oxidized in a manner known per se by means of a chlorine/hydrochloric acid mixture. The reduction of the nitro group to the amino group is carried out as described above.

It is also possible to use another process variant, in which a compound of the formula (11) is first subjected to a condensation reaction with one of the amines of the formulae (13a) to (13d), the resulting product is oxidized with a peroxide to give the sulfone, the nitro group is then reduced to the amino group, the resulting amino compound is subjected to a condensation reaction with a dye of the formula (5) and, finally, the hydroxyl group in the radical of one of the amines of the formulae (13a) to (13d) is sulfated.

The amines of the formulae (12a) to (13d) which are used as starting compounds can be prepared analogously to the process of Example 1 in German Offenlegungsschrift No. 2,614,550.

The condensation reactions of the dyes of the formula (5) with the amines of the formulae (6) or (7) are preferably carried out in aqueous solution or suspension at low temperatures and at a strongly acid, neutral or weakly alkaline pH. It is advantageous if the hydrogen halide liberated in the course of the condensation is neutralized continuously by adding aqueous alkali metal hydroxides, carbonates or bicarbonates. The amines of the formulae (6) and (7) employed are the free amines or their salts, preferably in the form of the hydrochloride. The reaction is carried out at temperatures between about 0° and 100° C., preferably between 25° and 75° C., with the addition of acid-binding agents, preferably sodium carbonate, and within a pH range from 2 to 8, preferably 5 to 6.5.

The reactive dyes of the formula (1) are suitable for dyeing and printing a very wide variety of materials, such as silk, leather, wool, polyamide fibres and polyurethanes, and particularly cellulose-containing fibre materials of all types. Examples of such fibre materials are the natural cellulose fibres, such as cotton, linen and hemp, and also cel-lulose and regenerated cellulose. The reactive dyes of the formula (1) are also suitable for dyeing or printing fibres which contain hydroxyl groups and are present in mixed fabrics, for example mixtures of cotton with polyester fibres or polyamide fibres.

The dyes according to the invention can be applied to the fibre material and fixed on the fibre in various ways, in particular in the form of aqueous dye solutions and printing pastes. They are suitable for both the exhaustion process and for dyeing by the pad-dyeing process, in which the goods are impregnated with aqueous dye solutions, if appropriate containing salts, and the dyes are fixed after an alkali treatment or in the presence of alkali, if necessary with the application of heat. They are particularly suitable for the so-called cold pad-batch process, in which the dye is applied on the padder together with the alkali and is then fixed by storing for several hours at room temperature. After being fixed, the dyes or prints are thoroughly rinsed with cold and hot water, if necessary with the addition of an agent which has a dispersing action and promotes the diffusion of the non-fixed portions.

If the reactive dyes of the formula (1) in which D is the radical of an anthraquinone dye exhibit insufficient solubility in the alkaline dye liquor, this drawback can be overcome in the manner known from the literature by adding dispersing agents or other non-coloured compounds, for example a naphthalenesulfonic acid/formaldehyde condensate or, in particular, anthraquinone-2-sulfonic acid.

The reactive dyes of the formula (1) are distinguished by a high reactivity, good capacity for being fixed and a very good build-up capacity. They can, therefore, be employed by the exhaustion dyeing process at low dyeing temperatures and require only short steaming times in the pad-steam process. The degrees of fixation are high and the non-fixed portions can be washed out readily, the difference between the degree of exhaustion and the degree of fixation being remarkably small, i.e. the hydrolysis loss is very low. The reactive dyes of the formula (1) are also particularly suitable for printing, in particular on cotton, but also for printing fibres containing nitrogen, for example wool or silk or mixed fabrics containing wool or silk.

The dyeings and prints produced on cellulose fibre materials by means of the dyes according to the invention possess a high depth of colour and a high stability of the fibre/dye linkage, both in the acid range and in the alkaline range, and also good fastness to light and very good fastness properties to wet processing, such as fastness to washing, water, seawater, cross-dyeing and perspiration, and also good fastness to pleating, fastness to ironing and fastness to rubbing.

The following examples serve to illustrate the invention. The temperatures are quoted in degrees centigrade, parts are parts by weight and percentages relate to percentages by weight, unless otherwise stated. The ratio of parts by weight to parts by volume is that of kilograms to liters.

EXAMPLE 1

11.5 parts of 1-amino-4-bromoanthraquinone-2-sulfonic acid and 12 parts of 1-amino-4-$\beta$-($\beta'$-hydroxyethylsulfonyl)-ethylaminocarbonylmethoxybenzene-3-sulfonic acid are suspended in 120 parts of water.

26 parts of sodium bicarbonate are sprinkled in at room temperature, whereby a pH of 8.5 is reached. The suspension is heated to 75° C.

0.3 part of 1:1 copper powder/copper-I chloride is introduced at 70° to 75° C., in 12 portions in the course of 3 hours. The reaction is complete after a further hour at 75° C. The suspension is cooled to room temperature and the product is salted out by means of 13 g of sodium chloride and is filtered off.

The paste thus obtained is dried and, in order to prepare the sulfuric acid ester, is introduced into three times its weight of sulfuric acid monohydrate and stirred until complete solution is reached. The dye solution is then poured onto ice, whereby the ester-dye is precipitated. It is filtered off, then stirred into an ice-/water mixture and, after neutralization with potassium carbonate, salted out by sprinkling in potassium chloride, filtered off and dried.

The resulting reactive dye of the formula

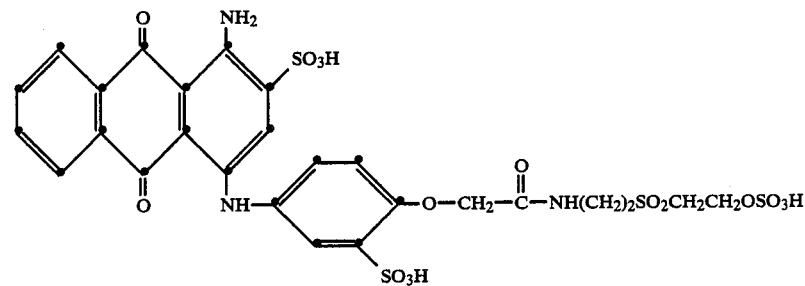

dyes cotton in clear blue shades.

The following dyes can be synthesized analogously:

No. 2

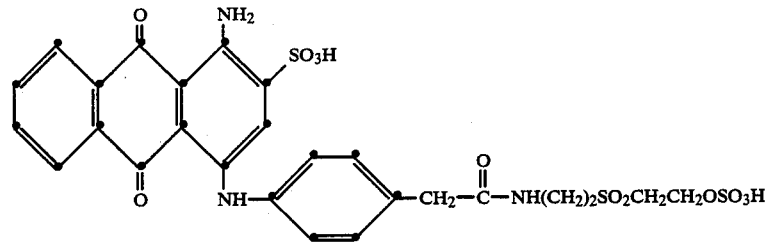

3

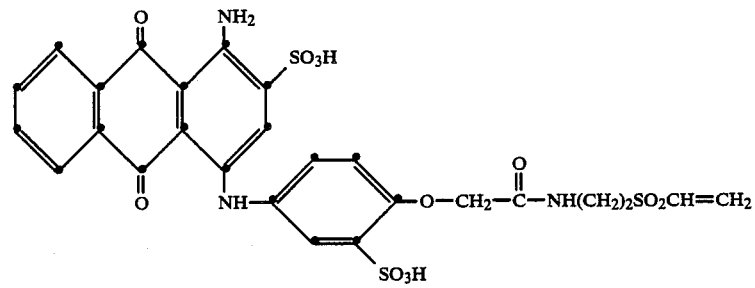

-continued
| | No. |
|---|---|
| 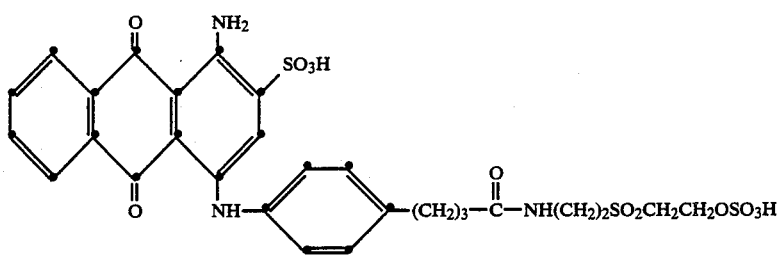 | 4 |
| 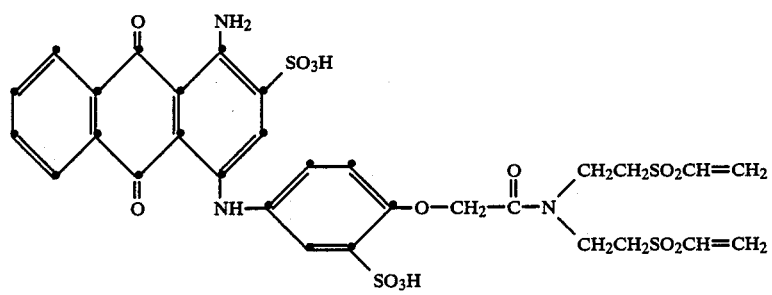 | 5 |
| 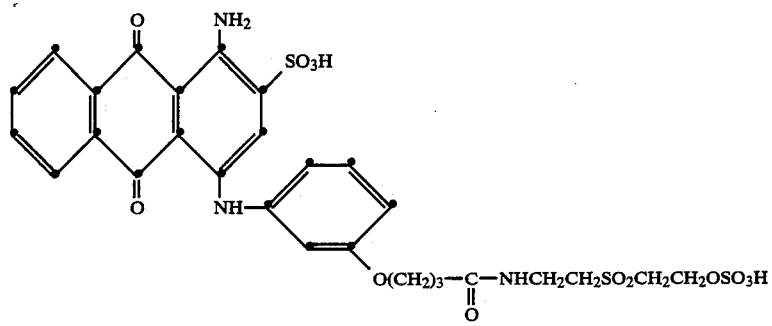 | 6 |
| 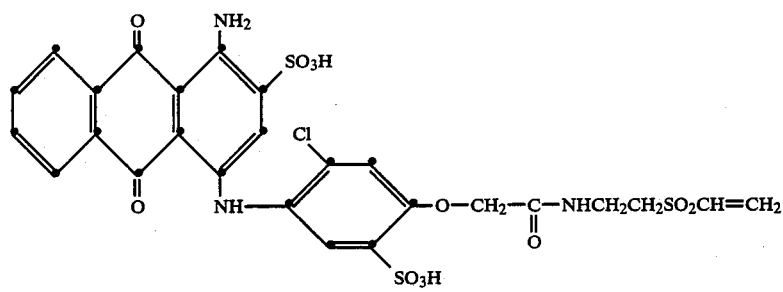 | 7 |
| 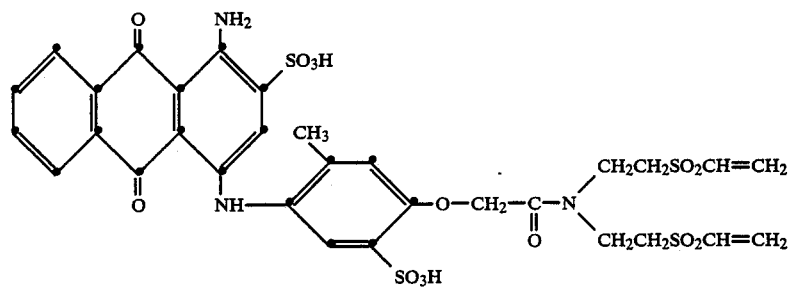 | 8 |

-continued

| | No. |
|---|---|
| 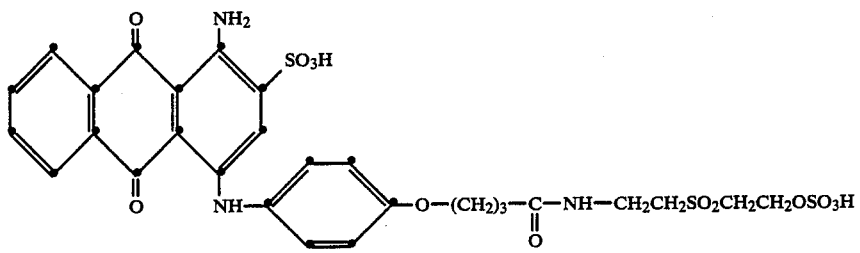 | 9 |
| 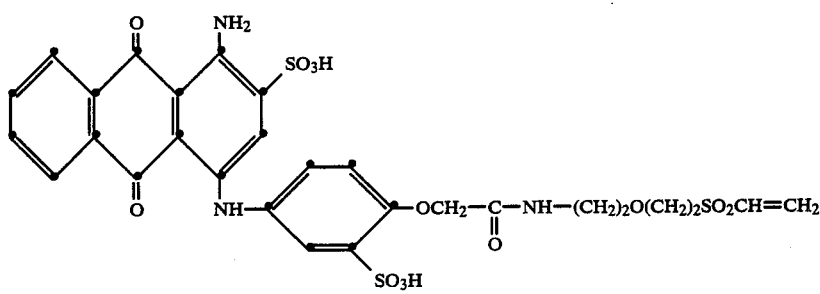 | 10 |
| 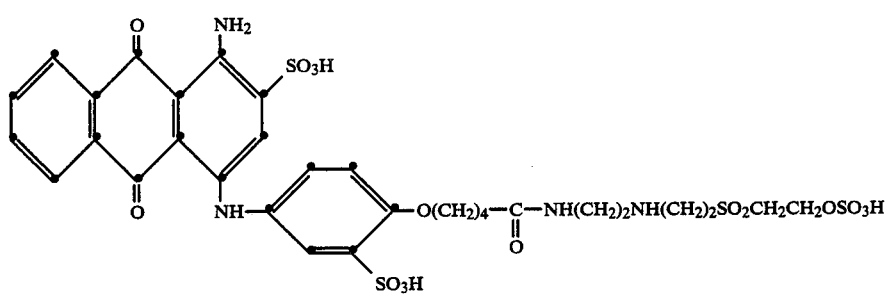 | 11 |
| 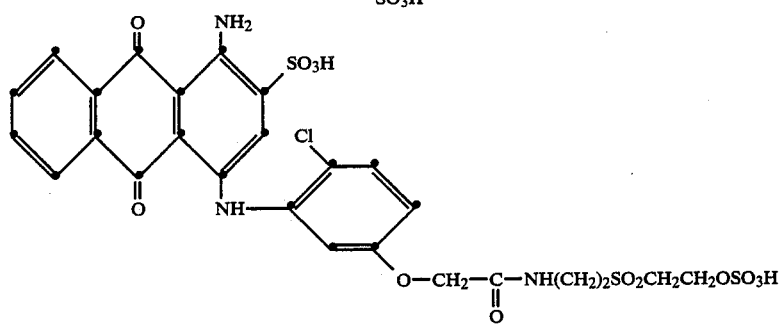 | 12 |
| 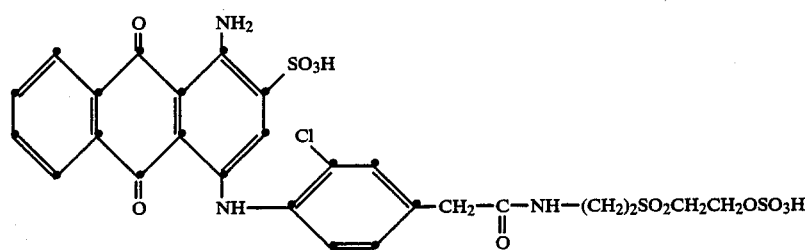 | 13 |

EXAMPLE 14

300 parts of chlorosulfonic acid are initially taken at room temperature.

36 parts of copper phthalocyanine are then introduced in portions in the course of one hour. The temperature is then raised slowly to 110° C. in the course of two hours. The temperature is raised to 135° C. in the course of one hour. The reaction solution is stirred for 6½ hours at 130° to 135° C., with good stirring, and is then cooled to room temperature and discharged into an ice/water mixture; final volume 2.5 liters.

37 parts of sodium chloride are then added and the product is filtered off. The material on the filter is washed with ice water (1.5% NaCl) until Congo red indicator paper no longer changes colour.

The 250 parts of paste are suspended in 800 parts of ice water, pH 2.5 to 3.0.

A solution of
63 parts of 1-amino-4-β-(β'-chloroethylsulfonyl)-ethylaminocarbonylmethoxybenzene-3-sulfonic acid hydrochloride, dissolved in

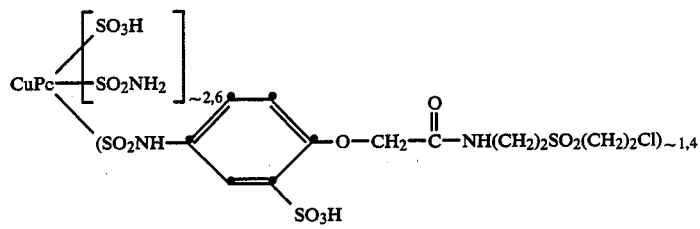

200 parts of water, is then added; pH approx. 2.0. The pH is slowly raised to 5.0 to 5.5 with 20 parts of concentrated ammonia solution, in the course of which the temperature rises gradually to 25° C.

At the end of the reaction, the mixture is stirred for one hour at 50° C., while the pH is kept at a value of 6.5 to 7.0 with 40 ml of concentrated ammonia.

The dye of the following formula is salted out by means of 120 parts of sodium chloride. It dyes cotton in turquoise shades.

The following dyes can be synthesized analogously:

| No. |
|---|
| 15 |

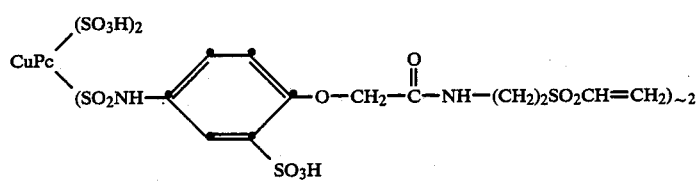

| 16 |

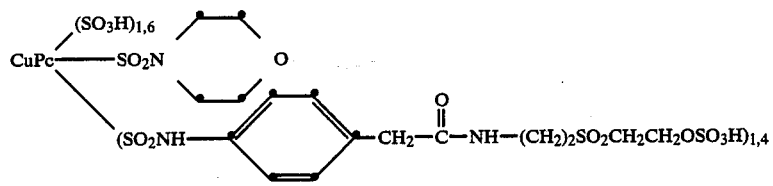

| 17 |

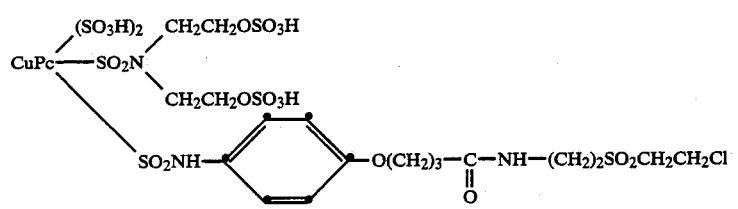

| 18 |

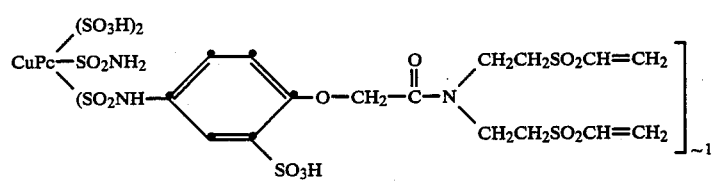

| 19 |

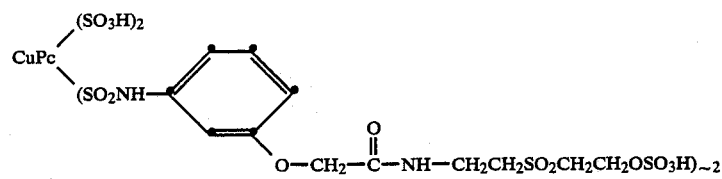

| 20 |

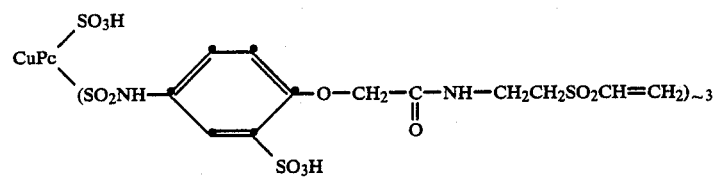

No. 21

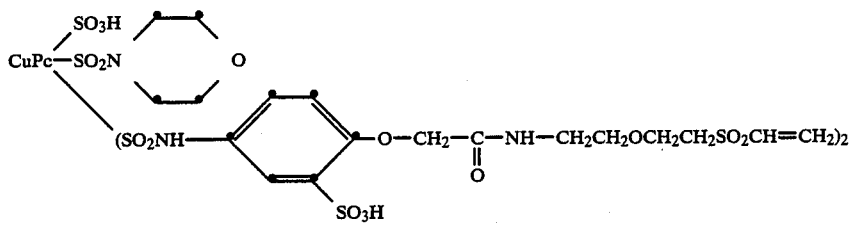

Dyeing Instructions I 2 parts of the dye obtained in Example 1 are dissolved in 400 parts water; 1,500 parts of a solution containing 53 g of sodium chloride per liter are added. 100 parts of a cotton fabric are introduced into this dyebath at 40° C. After 45 minutes, 100 parts of a solution containing 16 g of sodium hydroxide and 20 g of calcined sodium carbonate per liter are added. The temperature of the dyebath is kept at 40° C. for a further 45 minutes. The dyed goods are then rinsed, soaped at the boil for a quarter of an hour with a nonionic washing agent, rinsed again and dried.

Dyeing instructions II 2 parts of the reactive dye obtained in Example 1 are dissolved in 400 parts of water; 1,500 parts of a solution containing 53 g of sodium chloride per liter are added. 100 parts of a cotton fabric are introduced into this dyebath at 35° C. After 20 minutes, 100 parts of a solution containing 16 g of sodium hydroxide and 20 g of calcined sodium carbonate per liter are added. The temperature of the dyebath is kept at 35° C. for a further 15 minutes. The temperature is then raised to 60° C. in the course of 20 minutes. The temperature is kept at 60° C. for a further 35 minutes. The goods are then rinsed, soaped at the boil for a quarter of an hour with a nonionic washing agent, rinsed again and dried.

Dyeing instructions III 8 parts of the reactive dye obtained in Example 1 are dissolved in 400 parts of water; 1,400 parts of a solution containing 100 g of sodium sulfate per liter are added. 100 parts of a cotton fabric are introduced into this dyebath at 25° C. After 10 minutes, 200 parts of a solution containing 150 g of trisodium phosphate per liter are added. The temperature of the dyebath is then raised to 60° C. in the course of 10 minutes. The temperature is kept at 60° C. for a further 90 minutes. The goods are then rinsed, soaped at the boil for a quarter of an hour with a nonionic washing agent, rinsed again and dried.

Dyeing instructions IV 4 parts of the reactive dye obtained in Example 1 are dissolved in 50 parts of water. 50 parts of a solution containing 5 g of sodium hydroxide and 20 g of calcined sodium carbonate per liter are added. The resulting solution is used to pad a cotton fabric so that it takes up 70% of its weight, and it is then wound up on a beam. The cotton fabric is stored in this manner for 3 hours at room temperature. The dyed goods are then rinsed, soaped at the boil for a quarter of an hour with a nonionic washing agent, rinsed again and dried.

Dyeing instructions V 6 parts of the reactive dye obtained in Example 1 are dissolved in 50 parts of water. 50 parts of a solution containing 16 g of sodium hydroxide and 0.04 liter of waterglass (38° Bé) per liter are added. The resulting solution is used to pad a cotton fabric so that it takes up 70% of its weight, and it is then rolled up on a beam. The cotton fabric is stored in this manner for 10 hours at room temperature. The dyed goods are then rinsed, soaped at the boil for a quarter of an hour with a nonionic washing agent, rinsed again and dried.

Dyeing instructions VI 2 parts of the reactive dye obtained in Example 1 are dissolved in 100 parts of water by adding 0.5 part of sodium m-nitrobenzenesulfonate. The resulting solution is used to impregnate a cotton fabric so that it takes up 75% of its weight, and it is then dried. The fabric is then impregnated with a solution, warmed to 20° C. and containing 4 g of sodium hydroxide and 300 g of sodium chloride per liter, and is squeezed out to an increase in weight of 75%, and the dyeing is steamed for 30 seconds at 100° to 102° C., rinsed, soaped for a quarter of an hour in a 0.3% boiling solution of a nonionic washing agent, rinsed and dried.

Printing instructions I 3 parts of the reactive dye obtained in Example 1 are sprinkled, with rapid stirring, into 100 parts of a stock thickener containing 50 parts of 5% sodium alginate thickener, 27.8 parts of water, 20 parts of urea, 1 part of sodium m-nitrobenzenesulfonate and 1.2 parts of sodium bicarbonate. The printing paste obtained in this way is used to print a cotton fabric, and the resulting printed material is dried and steamed for 2 minutes at 102° C. in saturated steam. The printed fabric is then rinsed, if necessary soaped at the boil and rinsed again, and is then dried.

Printing instructions II 5 parts of the reactive dye obtained in Example 1 are sprinkled, with rapid stirring, into 100 parts of a stock thickener containing 50 parts of 5% sodium alginate thickener, 36.5 parts of water, 10 parts of urea, 1 part of sodium m-nitrobenzenesulfonate and 2.5 parts of sodium bicarbonate. The resulting printing paste, the stability of which meets the technical requirements, is used to print a cotton fabric, and the resulting printed material is dried and steamed for 8 minutes at 102° C. in saturated steam. The printed fabric is then rinsed, if necessary soaped at the boil and rinsed again, and is then dried.

What is claimed is:
1. A reactive dye of the formula

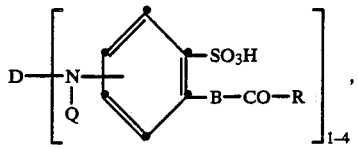 (1)

in which D is the radical of a phthalocyanine, formazan or dioxane dye; Q is hydrogen, $C_1$-$C_4$ alkyl or $C_1$-$C_4$ alkyl substituted by carboxyl, sulfo, cyano, hydroxyl, $C_1$-$C_4$ alkoxy or halogen; B is a radical $-(CH_2)_n$, $-O-(CH_2)_n$ or $-NH-(CH_2)_n$ and n is 1 to 6; R is a radical of the formula

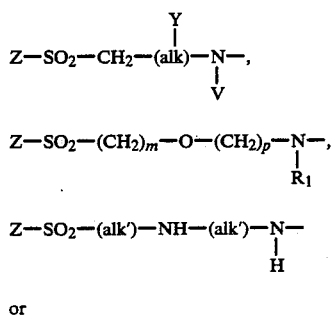

Z is β-sulfatoethyl, β-thiosulfatoethyl, β-phosphatoethyl, β-acetoxyethyl, β-halogenethyl or vinyl; alk is an alkylene radical having 1 to 6 C atoms or branched isomers thereof; Y is hydrogen, chlorine, bromine, fluorine, hydroxyl, sulfato, carbacyloxy having up to 4 C atoms, cyano, carboxyl, alkoxycarbonyl having 1 to 5 C atoms, carbamoyl or a radical $-SO_2-Z$ in which Z is as defined above; V is hydrogen, $C_1$-$C_4$alkyl or $C_1$-$C_4$alkyl substituted by carboxyl, sulfo, carbamoyl, N-methylcarbamoyl, N-ethylcarbamoyl, N,N-dimethylcarbamoyl, N,N-diethylcarbamoyl, alkoxy having 1 or 2 C atoms, halogen or hydroxyl; or is a radical

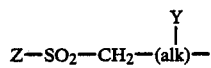

in which Z, alk and Y are as defined above; $R_1$ is hydrogen or $C_1$-$C_6$alkyl; the alk's independently of one another are polymethylene having 2 to 6 C atoms or branched isomers thereof; m is 1 to 6, p is 1 to 6 and q is 1 to 6.

2. A reactive dye according to claim 1, in which D is the radical of a phthalocyanine dye.

3. A reactive dye according to claim 2, in which D is the radical of a phthalocyanine dye of the formula

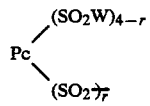

Pc is the radical of a copper or nickel phthalocyanine; W is $-OH$ and/or $-NR_3R_4$; $R_3$ and $R_4$ independently of one another are hydrogen or alkyl which has 1 to 4 carbon atoms and can be substituted by hydroxyl, alkoxy, hydroxyalkoxy, sulfo, sulfato or sulfatoalkoxy, or in which $-NR_3R_4$ forms morpholino; and r is 1 to 4.

4. A reactive dye according to claim 1, in which Z is the β-sulfatoethyl, β-chloroethyl or vinyl group.

* * * * *